United States Patent
Lee et al.

(10) Patent No.: US 10,976,916 B2
(45) Date of Patent: Apr. 13, 2021

(54) ELECTRONIC DEVICE AND METHOD FOR SWITCHING AND ALIGNING APPLICATIONS THEREOF

(71) Applicant: Samsung Electronics Co., Ltd., Suwon-si (KR)

(72) Inventors: Jongkee Lee, Seoul (KR); Jungyeob Oh, Seongnam-si (KR); Bonghak Choi, Goyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/066,489

(22) PCT Filed: Jan. 5, 2017

(86) PCT No.: PCT/KR2017/000164
§ 371 (c)(1),
(2) Date: Jun. 27, 2018

(87) PCT Pub. No.: WO2017/142195
PCT Pub. Date: Aug. 24, 2017

(65) Prior Publication Data
US 2019/0018565 A1   Jan. 17, 2019

(30) Foreign Application Priority Data
Feb. 15, 2016  (KR) .......................... 10-2016-0017312

(51) Int. Cl.
*G06F 3/048*  (2013.01)
*G06F 3/0488*  (2013.01)
(Continued)

(52) U.S. Cl.
CPC .......... *G06F 3/0488* (2013.01); *G06F 1/1643* (2013.01); *G06F 3/0482* (2013.01);
(Continued)

(58) Field of Classification Search
CPC ...... G06F 3/0412; G06F 3/0488; G06F 3/033; G06F 3/16; G06F 3/0482; G06F 9/48
See application file for complete search history.

(56) References Cited

U.S. PATENT DOCUMENTS

| | | | |
|---|---|---|---|
| 9,274,807 B2 * | 3/2016 | Shiplacoff | G06F 3/0482 |
| 9,703,468 B2 * | 7/2017 | Reeves | G06F 3/04883 |
| 10,175,848 B2 * | 1/2019 | Haapsaari | G06F 3/0482 |
| 2004/0100479 A1 * | 5/2004 | Nakano | G06F 1/1626 |
| | | | 715/700 |

(Continued)

FOREIGN PATENT DOCUMENTS

| | | |
|---|---|---|
| EP | 2 631 759 A2 | 8/2013 |
| KR | 10-2011-0043021 A | 4/2011 |

(Continued)

OTHER PUBLICATIONS

Extended European Search Report dated Jul. 3, 2019, issued in European Patent Application No. 17753357.7-1221.

*Primary Examiner* — Rashawn N Tillery
(74) *Attorney, Agent, or Firm* — Jefferson IP Law, LLP

(57) ABSTRACT

Various examples of the present invention relate to an electronic device and a method for displaying applications used in the electronic device. The electronic device includes a wireless communication unit; a touch screen; a processor coupled to the wireless communication unit and the touch screen; and a memory coupled to the processor, wherein the memory, when executed, stores instructions to cause the processor to control to: display, on the touch screen, an execution screen of a first application being executed among a plurality of applications having a stack order, display, on the touch screen, an execution screen of a second application among the plurality of applications according to the stack order, instead of the execution screen of the first application, in response to a first swipe gesture input from a first position of the touch screen while the execution screen of the first application is displayed, display, on the touch screen, an execution screen of a third application among the plurality (Continued)

of applications according to the stack order, instead of the execution screen of the first application, in response to a second swipe gesture input from a second position of the touch screen while the execution screen of the first application is displayed, and change the stack order of the first application, the second application, and the third application, based on a user input for interacting with one of the first application, the second application, and the third application. Other various examples are possible other than the examples disclosed in the present invention.

22 Claims, 16 Drawing Sheets

(51) Int. Cl.
  *G06F 3/0482* (2013.01)
  *G06F 1/16* (2006.01)
  *G06F 3/0484* (2013.01)
(52) U.S. Cl.
  CPC ........ *G06F 3/0484* (2013.01); *G06F 3/04886* (2013.01); *G06F 2203/0339* (2013.01)

(56) References Cited

U.S. PATENT DOCUMENTS

| | | |
|---|---|---|
| 2011/0028138 A1 | 2/2011 | Davis-Moore et al. |
| 2012/0105363 A1 | 5/2012 | Sirpal et al. |
| 2013/0135294 A1 | 5/2013 | An |
| 2013/0174179 A1* | 7/2013 | Park ...................... G06F 9/4843 |
| | | 718/107 |
| 2013/0227419 A1* | 8/2013 | Lee .......................... G06F 9/48 |
| | | 715/728 |
| 2014/0344765 A1 | 11/2014 | Hicks et al. |
| 2014/0365945 A1 | 12/2014 | Karunamuni et al. |
| 2015/0097797 A1* | 4/2015 | Sirpal ................... G06F 1/1616 |
| | | 345/173 |
| 2017/0123625 A1* | 5/2017 | Gao ................... H04M 1/72522 |
| 2017/0131894 A1* | 5/2017 | de Moraes ............ G06F 3/0488 |
| 2017/0269961 A1 | 9/2017 | Fan et al. |

FOREIGN PATENT DOCUMENTS

| | | |
|---|---|---|
| KR | 10-2013-0076397 A | 7/2013 |
| KR | 10-2013-0091182 A | 8/2013 |
| KR | 10-2013-0097433 A | 9/2013 |
| KR | 10-1356368 B1 | 1/2014 |
| WO | 2015/065072 A1 | 5/2015 |

* cited by examiner

FIG. 15A

| App Name | N | L | |
|---|---|---|---|
| String | Integer | String | Integer |
| A | 5 | | |
| B | 3 | | |
| C | 10 | | |
| D | 21 | B | 3 |
| | | E | 9 |
| | | G | 6 |
| | | N | 8 |
| | | ... | ... |
| E | 11 | | |
| F | 4 | | |
| G | 8 | | |
| H | 16 | | |
| I | 12 | | |
| J | 7 | | |
| K | 19 | | |
| L | 1 | | |
| M | 33 | A | 2 |
| | | D | 17 |
| | | G | 5 |
| | | L | 1 |
| | | K | 10 |
| | | ... | ... |
| N | 24 | | |
| O | 13 | | |
| ... | ... | | |

ELECTRONIC DEVICE AND METHOD FOR SWITCHING AND ALIGNING APPLICATIONS THEREOF

TECHNICAL FIELD

Various embodiments of the present disclosure relate to an electronic device and a method capable of reducing switching operations between applications used in the electronic device and aligning application groups frequently used together in accordance with use patterns thereof.

BACKGROUND ART

With the development of electronic device technology, various kinds of applications executable in a portable electronic device mounted with a touch screen have been presented.

Applications installed in a portable electronic device may be selectively executed in accordance with user tastes.

Recently, multi-tasking for simultaneously executing a plurality of applications in a portable electronic device becomes possible.

After performing the multi-tasking, switching of the applications may be performed between foreground and background.

The foreground may be an environment in which applications having high priority are executed, and the background may be an environment in which applications having low priority are not executed.

DISCLOSURE OF INVENTION

Technical Problem

When various applications are simultaneously displayed, switching between the applications may be performed at least in two stages using a user interface provided in an electronic device.

In this case, in order for a user to execute a specific application, it is required to perform repeated movement among a home screen of the electronic device, the corresponding application, and a task manager.

Further, in the related art, although a plurality of applications are aligned and displayed in a stack structure in X-axis or Y-axis direction in the order of their execution time, it may exceed the limit of user's memory, and thus efficiency of switching of the corresponding applications may be lowered.

Accordingly, the electronic device may require realignment of the applications in accordance with use patterns (e.g., use frequency and execution order) of the corresponding applications.

Various embodiments of the present disclosure can provide a method capable of reducing switching operations between the applications used in the electronic device and realigning specific applications frequently used together by the user in accordance with the use patterns of the user (e.g., use frequency and execution order).

Solution to Problem

In accordance with various embodiments of the present disclosure, an electronic device includes a wireless communication unit; a touch screen; a processor coupled to the wireless communication unit and the touch screen; and a memory coupled to the processor, wherein the memory, when executed, stores instructions to cause the processor to control to: display, on the touch screen, an execution screen of a first application being executed among a plurality of applications having a stack order, display, on the touch screen, an execution screen of a second application among the plurality of applications according to the stack order, instead of the execution screen of the first application, in response to a first swipe gesture input from a first position of the touch screen while the execution screen of the first application is displayed, display, on the touch screen, an execution screen of a third application among the plurality of applications according to the stack order, instead of the execution screen of the first application, in response to a second swipe gesture input from a second position of the touch screen while the execution screen of the first application is displayed, and change the stack order of the first application, the second application, and the third application, based on a user input for interacting with one of the first application, the second application, and the third application.

In accordance with various embodiments of the present disclosure, a method for displaying applications includes displaying, by a processor, an execution screen of a first application being executed among a plurality of applications having a stack order on a touch screen; displaying, by the processor, on the touch screen, an execution screen of a second application among the plurality of applications according to the stack order, instead of the execution screen of the first application, in response to a first swipe gesture input from a first position of the touch screen while the execution screen of the first application is displayed; displaying, by the processor, on the touch screen, an execution screen of a third application among the plurality of applications according to the stack order, instead of the execution screen of the first application, in response to a second swipe gesture input from a second position of the touch screen while the execution screen of the first application is displayed; and changing, by the processor, the stack order of the first application, the second application, and the third application, based on a user input for interacting with one of the first application, the second application, and the third application.

In accordance with various embodiments of the present disclosure, an electronic device includes a wireless communication unit; a touch screen; a processor coupled to the wireless communication unit and the touch screen; and a memory coupled to the processor, wherein the memory, when executed, stores instructions to cause the processor to control to: display, on the touch screen, an execution screen of a first application among a plurality of applications being executed, display, on the entire touch screen, an execution screen of a second application among the plurality of applications being executed, instead of the execution screen of the first application, corresponding to a swipe gesture input from a specific position of the execution screen of the first application, and change a stack arrangement of the plurality of applications being executed corresponding to a touch gesture input from the execution screen of the second application.

In accordance with various embodiments of the present disclosure, a method for displaying applications includes displaying, by a processor, an execution screen of a first application among a plurality of applications being executed on an entire touch screen; displaying, by the processor, on the entire touch screen, an execution screen of a second application among the plurality of applications being executed, instead of the execution screen of the first application, corresponding to a swipe gesture input from a specific position of the execution screen of the first application; and changing, by the processor, a stack arrangement of the plurality of applications being executed corresponding to a touch gesture input from the execution screen of the second application.

In accordance with various embodiments of the present disclosure, there is provided a computer readable recording medium recorded with a program for performing an application display method in an electronic device, the program performing a method including displaying an execution screen of a first application being executed among a plurality of applications having a stack order on a touch screen; displaying, on the touch screen, an execution screen of a second application among the plurality of applications according to the stack order, instead of the execution screen of the first application, corresponding to a first swipe gesture input from a first position of the touch screen while the execution screen of the first application is displayed; displaying, on the touch screen, an execution screen of a third application among the plurality of applications according to the stack order, instead of the execution screen of the first application, corresponding to a second swipe gesture input from a second position of the touch screen while the execution screen of the first application is displayed; and changing the stack order of the first application, the second application, and the third application, based on a user input for interacting with one of the first application, the second application, and the third application.

In accordance with various embodiments of the present disclosure, there is provided a computer readable recording medium recorded with a program for performing an application display method in an electronic device, the program performing a method including displaying an execution screen of a first application among a plurality of applications being executed on an entire touch screen; displaying, on the entire touch screen, an execution screen of a second application among the plurality of applications being executed, instead of the execution screen of the first application, corresponding to a swipe gesture input from a specific position of the execution screen of the first application; and changing, by the processor, a stack arrangement of the plurality of applications being executed corresponding to a touch gesture input from the execution screen of the second application.

Advantageous Effects of Invention

According to various embodiments of the present disclosure, by switching the applications, for example, through swiping to the center in the first direction and the second directions of a global navigation area, the switching operations between the applications used in the electronic device can be reduced.

Further, according to various embodiments of the present disclosure, by performing the refresh function with respect to the plurality of applications executed by the user, a specific application group frequently used together by the user can be realigned in order in accordance with the user's use pattern (e.g., use frequency and execution order).

BRIEF DESCRIPTION OF DRAWINGS

FIGS. 15A and 15B are diagrams explaining another example of operation 1280 in a method for aligning applications according to various embodiments of the present disclosure.

MODE FOR THE INVENTION

Figure 1:
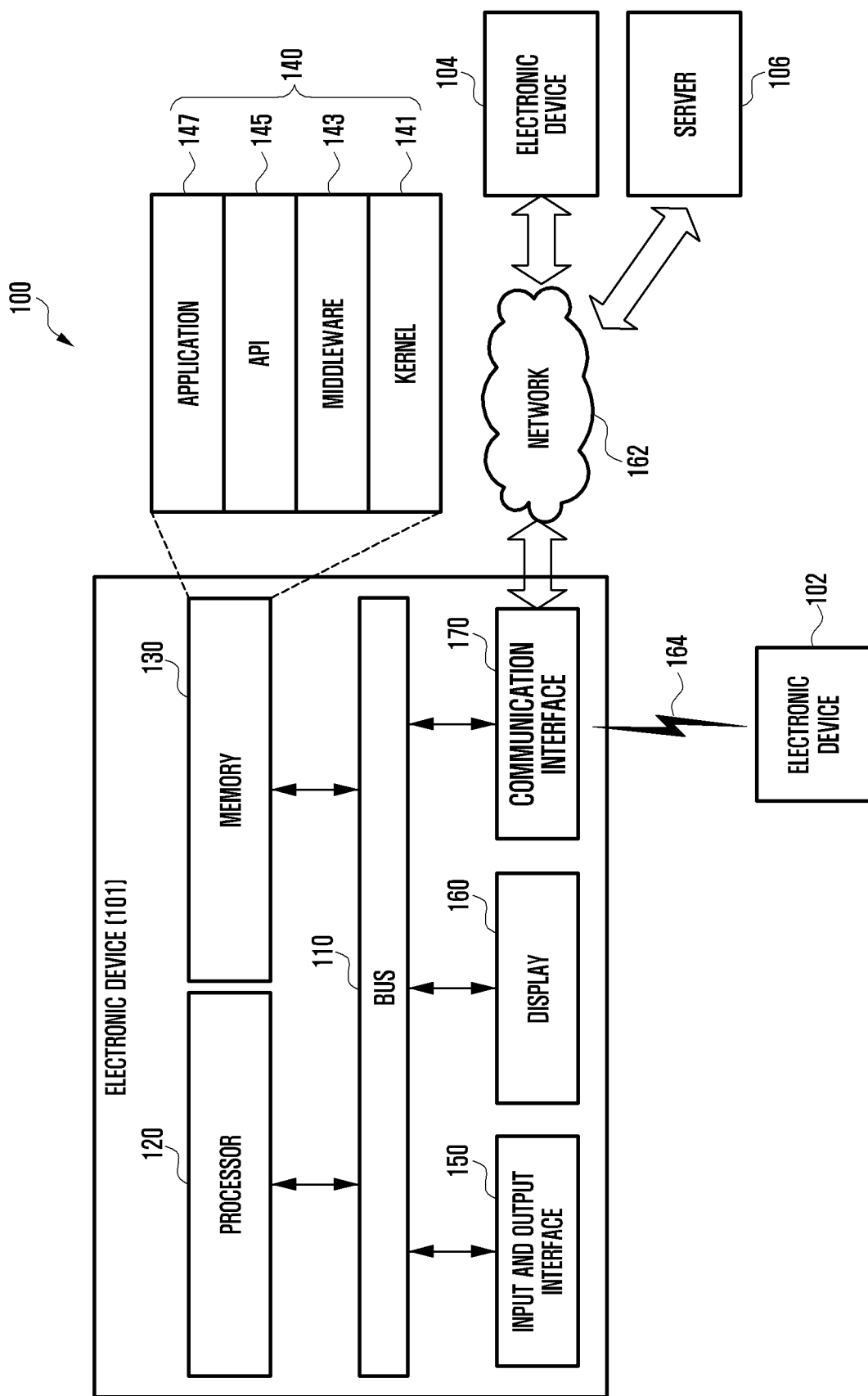
FIG. 1 is a block diagram illustrating a network environment including an electronic device according various embodiments of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

In connection with descriptions of the drawings, similar components are designated by the same reference numeral.

In various embodiments of the present disclosure, the expression "or" or "at least one of A or/and B" includes any or all of combinations of words listed together. For example, the expression "A or B" or "at least A or/and B" may include A, may include B, or may include both A and B. The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits). The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like). The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment 100 including an electronic device 101 according to various embodiments of the present disclosure.

The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101.

The bus 110 may be a circuit connecting the above described components 120, 130, and 150~170 and transmitting communications (e.g., control messages and/or data) between the above described components. The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS). The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body. The communication interface 170 is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
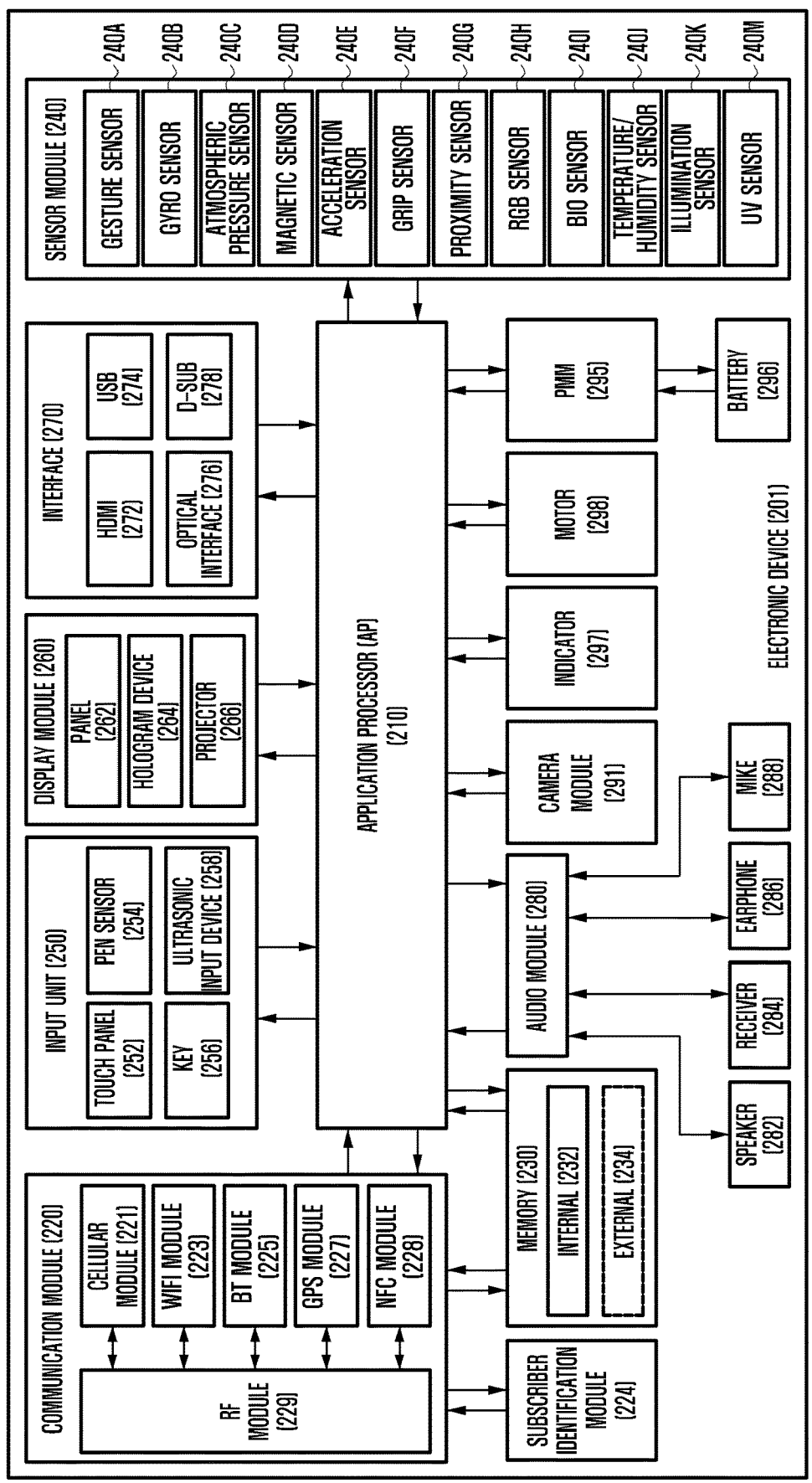
FIG. 2 is a block diagram of an electronic device according to various embodiments of the present disclosure.

FIG. 2 is a detailed block diagram showing a configuration of an electronic device 201 according to various embodiments.

For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, WiFi module 223, Bluetooth (BT) module 225, GNSS module 227 (e.g., a GPS module, Glonass module, Beidou module or Galileo module), NFC module 228, and Radio Frequency (RF) module 229. The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 1721 is also capable of including a communication processor (CP). Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module. The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266. The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc. The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc. The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc. Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
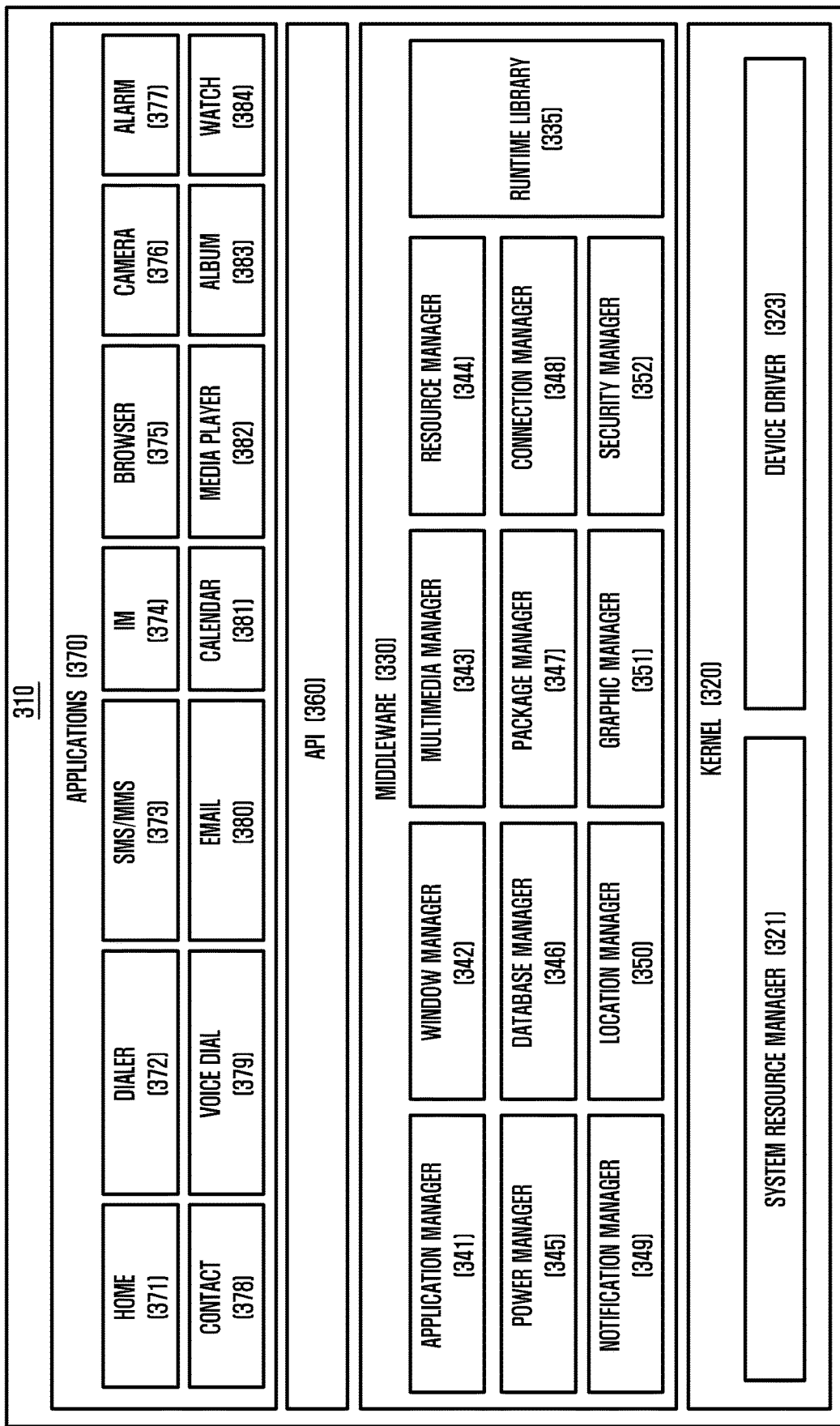
FIG. 3 is a block diagram of a program module according to various embodiment of the present disclosure.

FIG. 3 is a block diagram of a programming module according to various embodiments.

According to an embodiment, the program module 310 (e.g., program module 140 shown in FIG. 1) is capable of including an operation system (OS) for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc. The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like. The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370. The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function. The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components. The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.). According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices. For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user. The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc. According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems. According to various embodiments, at least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programing module may be implemented (e.g. executed) by the processor 120. At least a part of the programing module may include modules, programs, routines, sets of instructions, and processes for executing the at least one function. The computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure. The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

Figure 4:
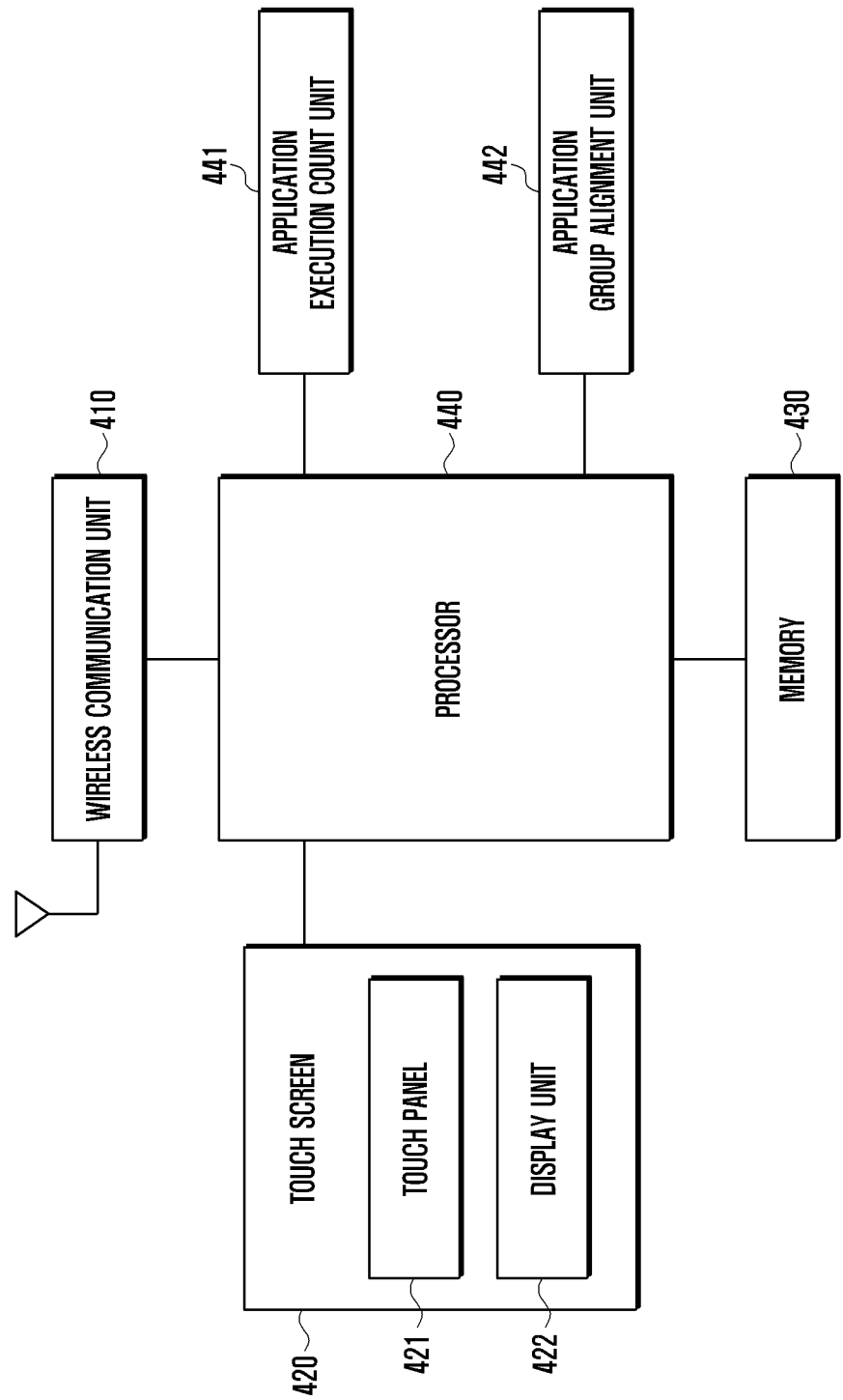
FIG. 4 is a diagram illustrating the configuration of an electronic device according to various embodiments of the present disclosure.

FIG. 4 is a diagram illustrating the configuration of an electronic device according to various embodiments of the present disclosure.

As illustrated in FIG. 4, an electronic device 400 according to various embodiments of the present disclosure may include a wireless communication unit 410, a touch screen 420, a memory 430, and a processor 440.

According to various embodiments, the wireless communication unit 410 may perform communication function of the electronic device 400. The wireless communication unit 410 may establish a communication channel with a network and perform communication function with at least one external device in order to support at least one of voice call, video call, and data communication. The wireless communication unit 410 may include a mobile communication module (at least one module capable of supporting various communication types, such as 2G, 3G, and 4G), a Wi-Fi module, and a near-field communication module. The wireless communication unit 410 may include an RF transmitter up-converts and amplifies the frequency of a transmitted signal, and an RF receiver low-noise-amplifies a received signal and down-converts the frequency of the received signal. Further, the wireless communication unit 410 may receive data through a radio channel, transmit the received data to the processor 440, and transmit the data output from the processor 440 to an external device through the radio channel.

The wireless communication unit 410 according to various embodiments may establish a communication channel with an external device, such as a server, to support mutual exchange of specific applications with the external device.

According to various embodiments, the touch screen 420 may perform input function and display function. For this, the touch screen 420 may include a touch panel 421 and a display unit 422. The touch panel 421 may be composed of touch sensing sensors, such as capacitive overlay, resistive overlay, and infrared beam, or may be composed of pressure sensors. In addition to the above-described sensors, the touch panel 421 according to an embodiment of the present disclosure may be composed of all kinds of sensor devices capable of sensing object contact or pressure. The touch panel 421 may sense user's touch input, and generate and transmit a sense signal to the processor 440. The sense signal may include coordinate data input through the user's touch. If the user inputs a touch position movement operation, the touch panel 421 may generate and transmit to the processor the sense signal including the coordinate data of a touch position movement path.

If the user swipes or drags in the first direction (e.g., left side) or the second direction (e.g., right side) in a state where the user touches the touch pad 421, the touch panel 421 according to various embodiments of the present disclosure may generate and transfer to the processor 440 the sense signal including coordinate information of the movement path regarding the touch.

Figure 5:
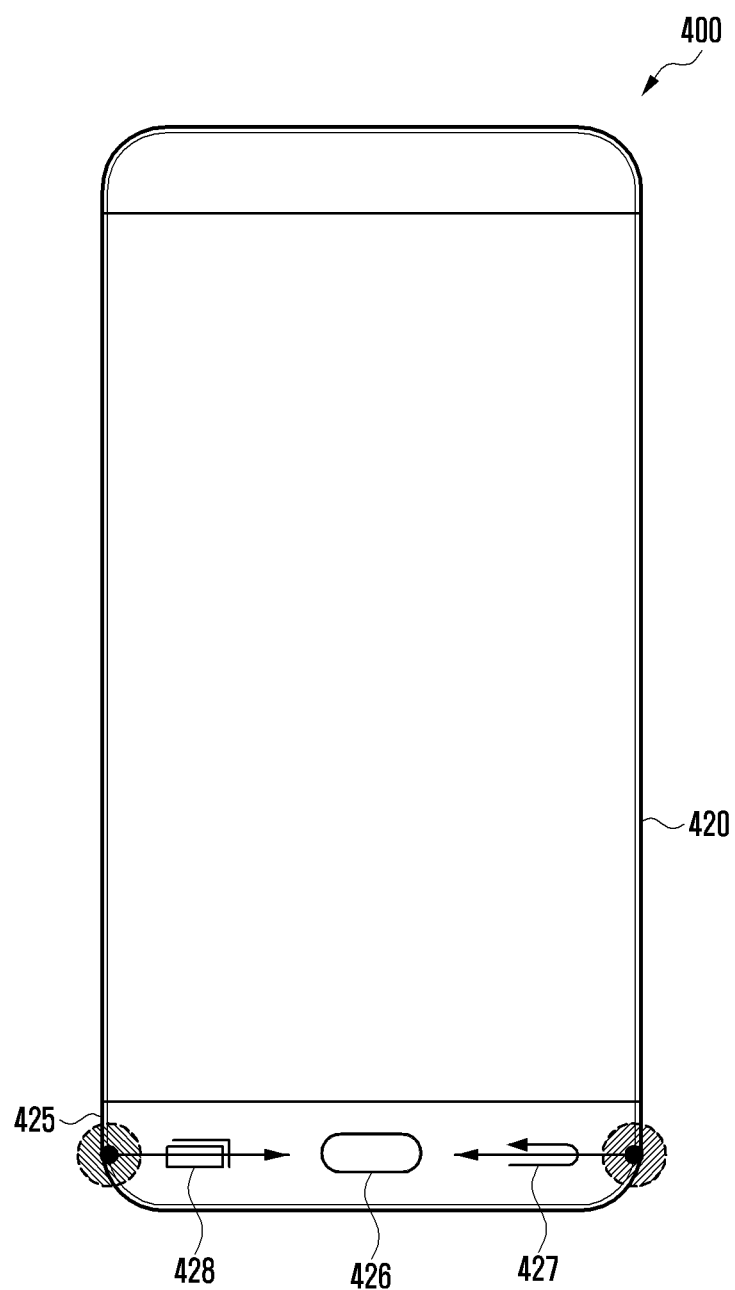
FIG. 5 is a diagram illustrating the configuration of a touch screen of an electronic device according to various embodiments of the present disclosure.

FIG. 5 is a diagram illustrating the configuration of a touch screen 420 of an electronic device 400 according to various embodiments of the present disclosure.

As illustrated in FIG. 5, the touch screen 420 including the touch panel 421 may operate to include, a global navigation area 425, for example, including a home key 426, a cancel key 427, and a menu key 428 in at least a part of a display screen. The home key 426 may display a home screen of the electronic device 400 in accordance with the user's touch, and enable the user to execute a desired task. The cancel key 427 may switch the current screen to the previous screen in accordance with the user's touch. For example, if a user's gesture is input to a position corresponding to the menu key 428, the touch screen may switch a screen from a state where one application is displayed on the overall screen of the touch screen 420 to a state where a list of a plurality of applications being currently executed is displayed in a stack structure. The menu key 428 may form a list of a plurality of applications executed by the user in a stack structure in accordance with the user's touch. A refresh key 429 may be formed around the global navigation area 425 (e.g., upper portion) (see FIG. 14). In accordance with the touch of the refresh key 429, the processor 440 may realign specific applications frequently used together by the user in a stack structure in accordance with the user's use pattern (e.g., use frequency and execution order). The home key 426, the cancel key 427, the menu key 428, and the refresh key 429 may be composed of soft keys operated in accordance with the user's touch or hard keys having physical buttons. The home key 426, the cancel key 427, the menu key 428, and the refresh key 429 may correspond to a user interface providing an environment in which the electronic device 400 according to the present disclosure can be conveniently used.

According to various embodiments, the display unit 422 may display information input by the user or information to be provided to the user including various kinds of menus of the electronic device 400. The display unit 422 may be formed by a liquid crystal display, an organic light emitted diode (OLED), an active matrix organic light emitting diode (AMOLED), flexible display, or a transparent display. The display unit 422 may provide various screens, for example, the home screen, menu screen, lock screen, game screen, web page screen, call screen, and music or moving image reproduction screen.

Figure 6:
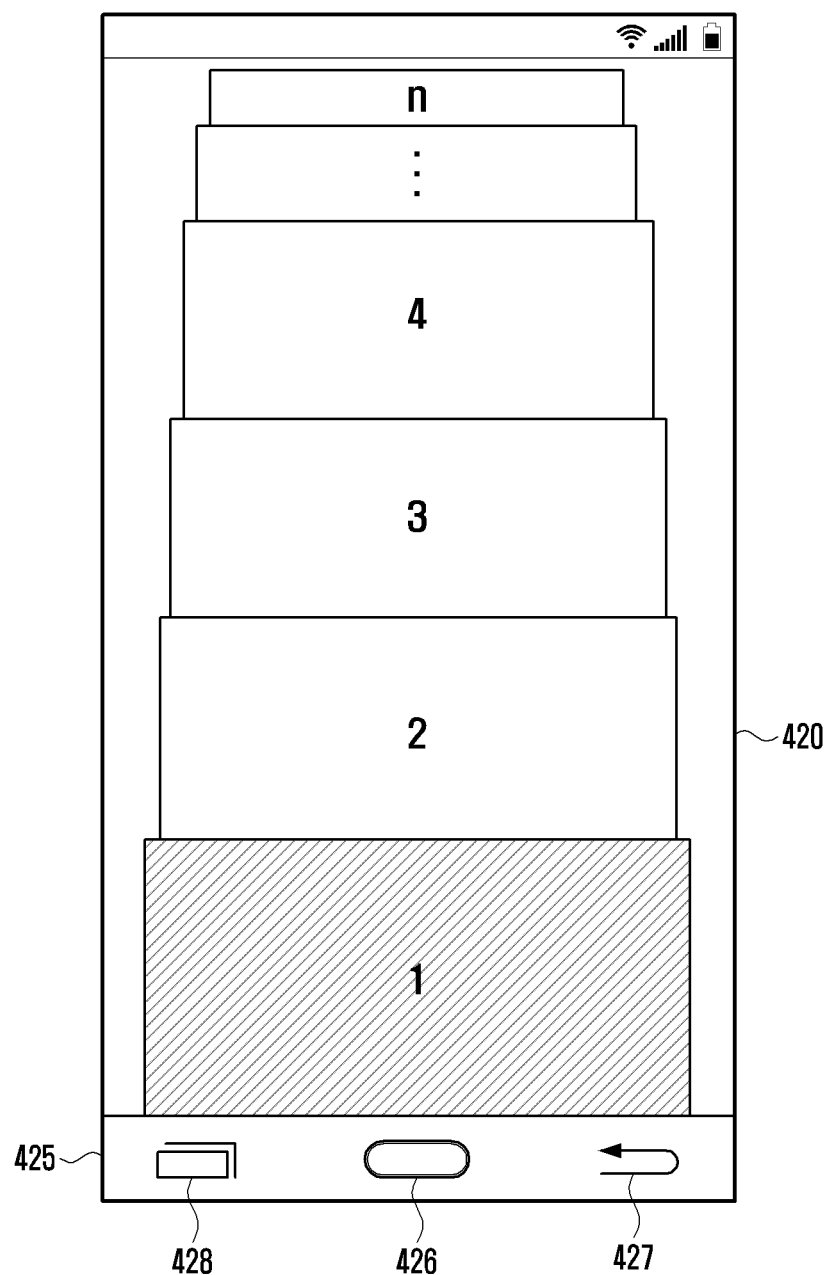
FIG. 6 is a diagram illustrating applications displayed on a touch screen of an electronic device in a stack structure according to various embodiments of the present disclosure.

FIG. 6 is a diagram illustrating applications displayed on a touch screen 420 including a display unit 422 in a stack structure according to various embodiments of the present disclosure.

As illustrated in FIG. 6, the display unit 422 according to various embodiments of the present disclosure may display first to n-th applications executed by a user in a stack structure as the user touches a menu key 428 of a global navigation area 425, for example, at least a partial area of the touch screen. For example, when the user touches the menu key 428, the first application 1 executed most lately may be displayed at the head of the display unit 422, and the n-th application n executed at the very first may be displayed at the tail of the display unit 422. The display unit 422 may navigate in order applications formed in a stack structure around the home key 426 formed in the global navigation area 425 on the lower portion of the touch screen 420 as touching and swiping the cancel key 427 leftward (home key direction) or touching and swiping the menu key 428 rightward (home key direction). The direction in which the cancel key 427 is touched and swipes in the direction of the home key 426 may be defined as the first direction, and the direction in which the menu key 428 is touched and swipes in the direction of the home key 426 may be defined as the second direction. That is, the first direction and the second direction may be different swipe directions. The touch and operation of the cancel key 427 in the direction of the home key 426 may be a first user input of swipe in the first direction, and the touch and operation of the menu key 428 in the direction of the home key 426 may be a second user input of swipe in the second direction.

According to various embodiments, the memory 430 may store a program for processing and control of the processor 440, the operating system (OS), various applications, and input/output data, and may store a program for controlling the overall operation of the electronic device 400. The memory 430 may store a user interface (UI) provided from the electronic device 400 and various configuration information required during function processing of the electronic device 400.

The memory 430 according to various embodiments of the present disclosure may install and store a plurality of applications. The memory 430 may count and store use frequency of each application, that is, execution information on the corresponding application used by the user. The application may be installed by default during manufacturing of the electronic device 400 or may be downloaded from an external server and installed by the user. The application may include all kinds of software that can be designed by the user using an input means. The execution information may include a data field obtained by arranging the execution information between the respective applications. The data field may count and store the execution information using one application and execution information of another application used to follow the one application. The data field may include an application name, the number of times of execution, and execution time.

According to various embodiments, the processor 440 may control the overall operation of the electronic device 400 and a signal flow between internal constituent elements and may process data. The processor 440 may be composed of a central processing unit (CPU), an application processor, and a communication processor. The processor 440 may be composed of a single core processor or a multi-core processor, and may be composed of a plurality of processors.

The processor 440 according to various embodiments of the present disclosure may execute the application in which a touch event has occurred. Whenever the application in which the touch event has occurred is executed by the user, the execution information of the application stored in the memory can be updated.

The processor 440 may include an application execution count unit 441 and an application group alignment unit 442. The application execution count unit 441 may count and store in the memory 430 the execution information on the application in which a touch event has occurred and has been executed. The application group alignment unit 442 may align in order an application group (e.g., 7 applications) being executed after execution of the corresponding application in a stack structure among the plurality of applications executed through occurrence of the touch event. For example, if 10 or more applications are executed through the user's touch, only 7 applications having high use frequency may remain in the memory 430, and 3 or more remaining applications may be deleted from the memory 430. The 7 applications remaining in the memory may be formed in the stack structure in which the application having the highest use frequency is deployed at the head and the application having the lowest use frequency is deployed at the tail. For example, if less than 7 applications are executed by the user's touch, only the less than 7 applications may be realigned in the order of their high use frequency. The application group alignment unit 442 may be executed by touching a refresh key 429 (see FIG. 14) formed on a lower portion of the touch screen 420. According to various embodiments of the present disclosure, although it is described that the processor 440 includes the application execution count unit 441 and the application group alignment unit 442, the processor 440 itself may directly perform the corresponding function without separately including the application execution count unit 441 and the application group alignment unit 442.

The electronic device 400 according to various embodiments of the present disclosure may be variously modified in accordance with the convergence trend of digital appliances. For example, the electronic device 400 according to the present disclosure may further include various sensor modules for sensing information related to the position change and other configurations non-mentioned as above, such as a GPS module for measuring the position of the electronic device 400.

Figure 7:
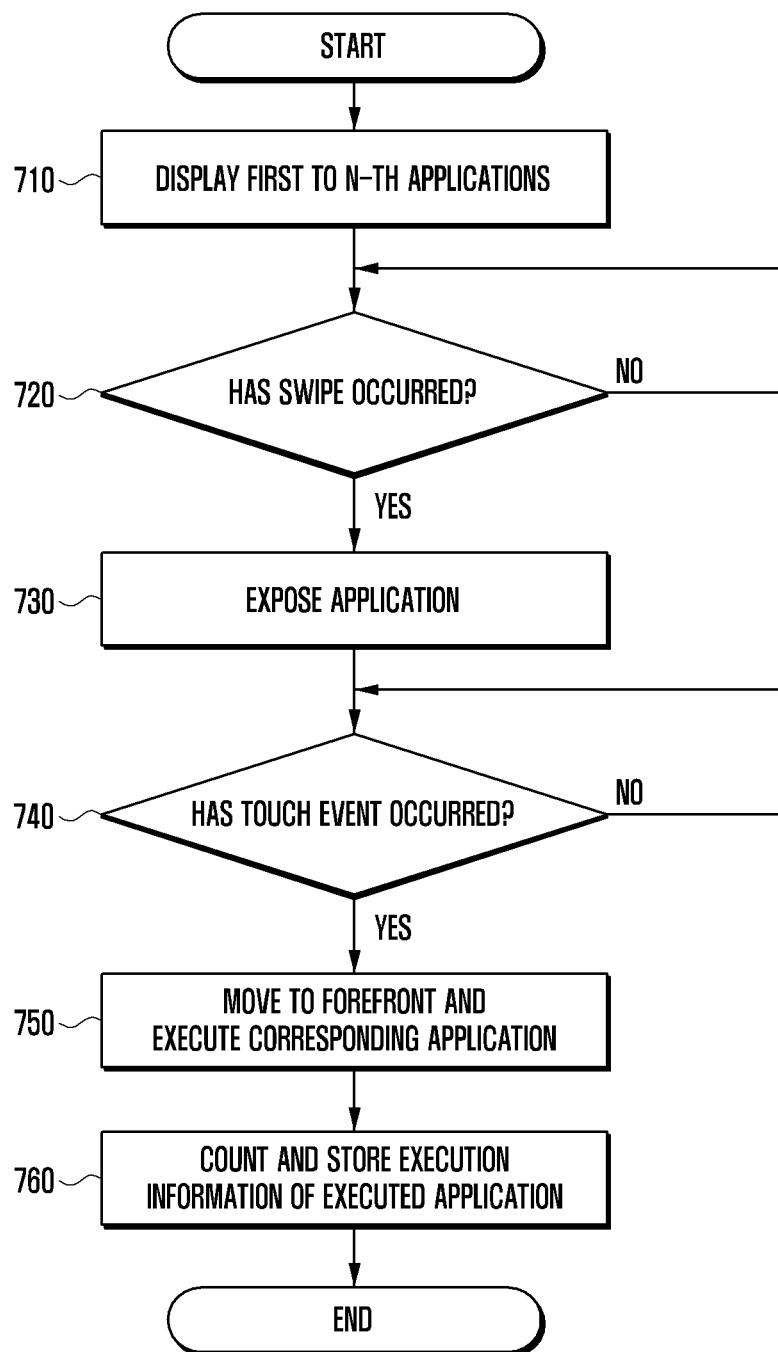
FIG. 7 is a flowchart illustrating a method for switching applications used in an electronic device according to various embodiments of the present disclosure.

FIG. 7 is a flowchart illustrating a method for switching applications used in an electronic device according to various embodiments of the present disclosure.

According to an embodiment, if a user touches a menu key 428 of a touch screen 420, a processor 440, at operation 710, may display the first to n-th applications 1 to n previously executed by the user on the touch screen 420 in a stack structure as illustrated in FIG. 6.

According to an embodiment, at operation 720, the processor 440 may determine whether a swipe has occurred by the user through a cancel key 427 and a menu key 428 of a global navigation area 425. The swipe may include touch and swipe of the cancel key 427 leftward (first direction) and touch and swipe of the menu key 42 rightward (second direction) around a home key 426 formed in the global navigation area 425. The swipe is not limited to swipe of the cancel key 427 and the menu key 428 in the direction of the home key 426, but may include a drag of the touch in upper (third direction) and lower (fourth direction) directions from a specific position of the touch screen 420. In an embodiment, although it is described that the corresponding applications can be navigated through the swipe operation, other various methods may be applied so far as they can navigate the applications.

According to an embodiment, if the swipe has occurred through operation 720, the processor 440, at operation 730, may expose the application according to the swipe operation so that the application can be identified.

Figure 8:
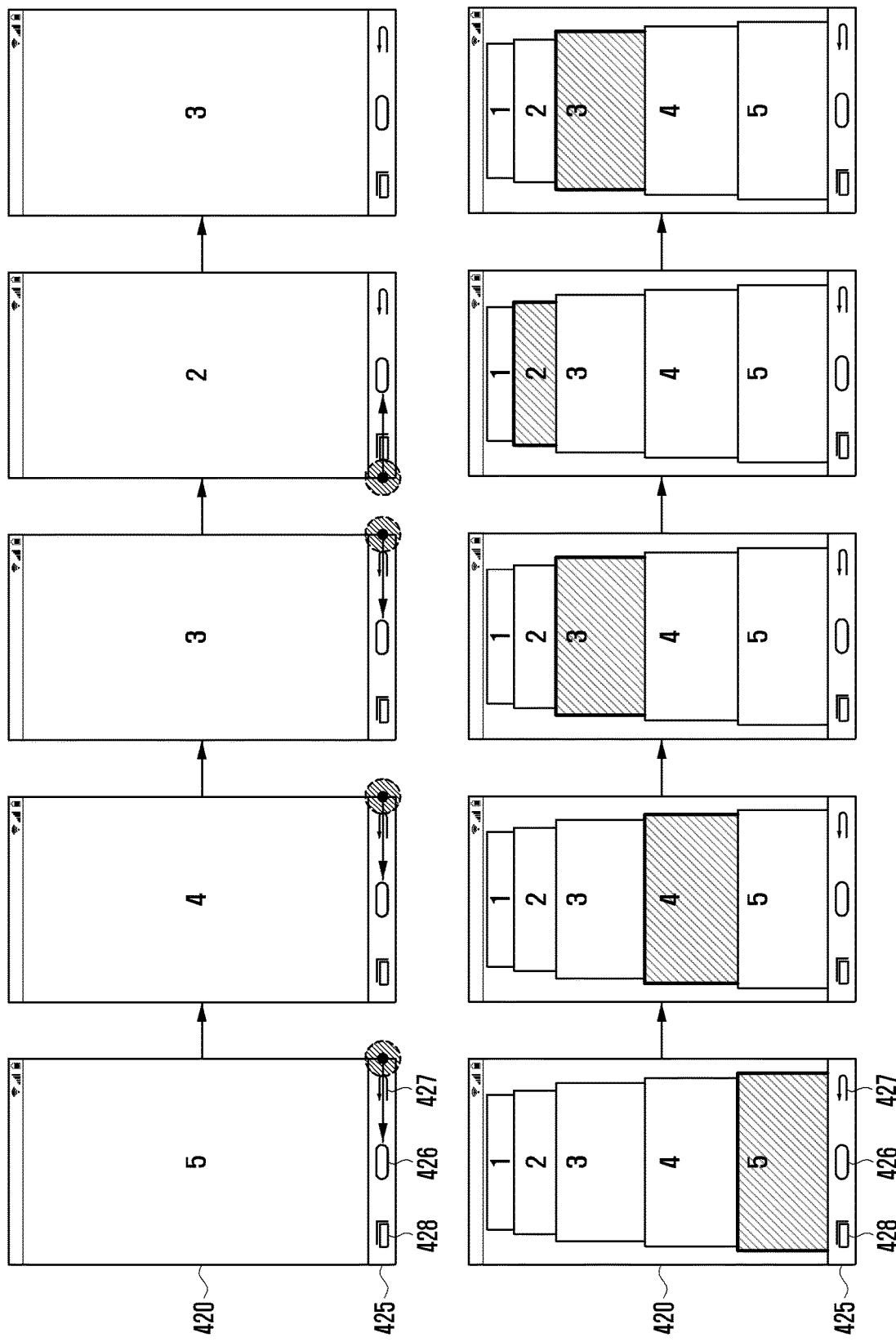
FIG. 8 is a diagram explaining an example of operation 730 in a method for switching applications according to various embodiments of the present disclosure.

FIG. 8 is a diagram explaining an example of operation 730 in a method for switching applications according to various embodiments of the present disclosure. Referring to FIG. 8, an example of the operation 730 will be described in detail.

As illustrated in FIG. 8, for example, 5 applications executed by a user may be displayed on a touch screen 420 in a stack structure. For example, the first to fifth applications 1 to 5 may be formed in the stack structure in accordance with the user's execution order. In a global navigation area 425 formed on a lower portion of the touch screen 420, if a user touches and swipes a cancel key 427 in the direction of a home key 426 (first direction), a processor 440 may expose the fourth application 4 so that the user can identify the fourth application 4. For example, the displayed screen may be changed from the display screen of the fifth application 5 to the display screen of the fourth application 4, and as another example, there is no position movement of the fifth application 5 and the fourth application 4, and only the fourth application 4 in the rear of the fifth application 5 may be clearly displayed, but the fifth and third to first applications that are remaining applications may be dimly displayed. Further, if the user touches the cancel key 427 once more and swipes the cancel key 427 in the direction of the home key 426 (first direction), the third application 3 is exposed so that the user can identify the same. For example, the display screen may be changed from the display screen of the fourth application 4 to the display screen of the third application 3, or as another example, only the third application 3, may be clearly displayed and exposed, but the fifth, fourth, second, and first applications that are the remaining applications may be dimly displayed. Further, if the user touches the cancel key 427 once more and swipes the cancel key 427 in the direction of the home key 426 (first direction), the second application 2 is exposed so that the user can identify the same, and for example, the display screen may be changed from the display screen of the third application to the display screen of the second application 2, or as another example, only the second application 2 may be clearly displayed and exposed, but the fifth, fourth, third, and first applications that are the remaining applications may be dimly displayed. On the other hand, if the user touches a menu key 428 and swipes the menu key 428 in the direction of the home key 426 (second direction), the processor 440 may clearly display and expose only the third application 3 exposed before the second application 2, but may dimly display the fifth, fourth, second, and first applications that are the remaining applications.

According to an embodiment, at operation 740, the processor 440 may determine whether a touch event has occurred by the user in any one of the plurality of applications displayed in the stack structure.

According to an embodiment, if a touch event for a specific application has occurred by the user at operation 740, the processor 440, at operation 750, may execute the application in which the touch event has occurred and may move the application to the head of the stack structure. That is, the processor 440 may switch the order and the position of the application in which the touch event has occurred to display the same through the touch screen 420.

Figure 9:
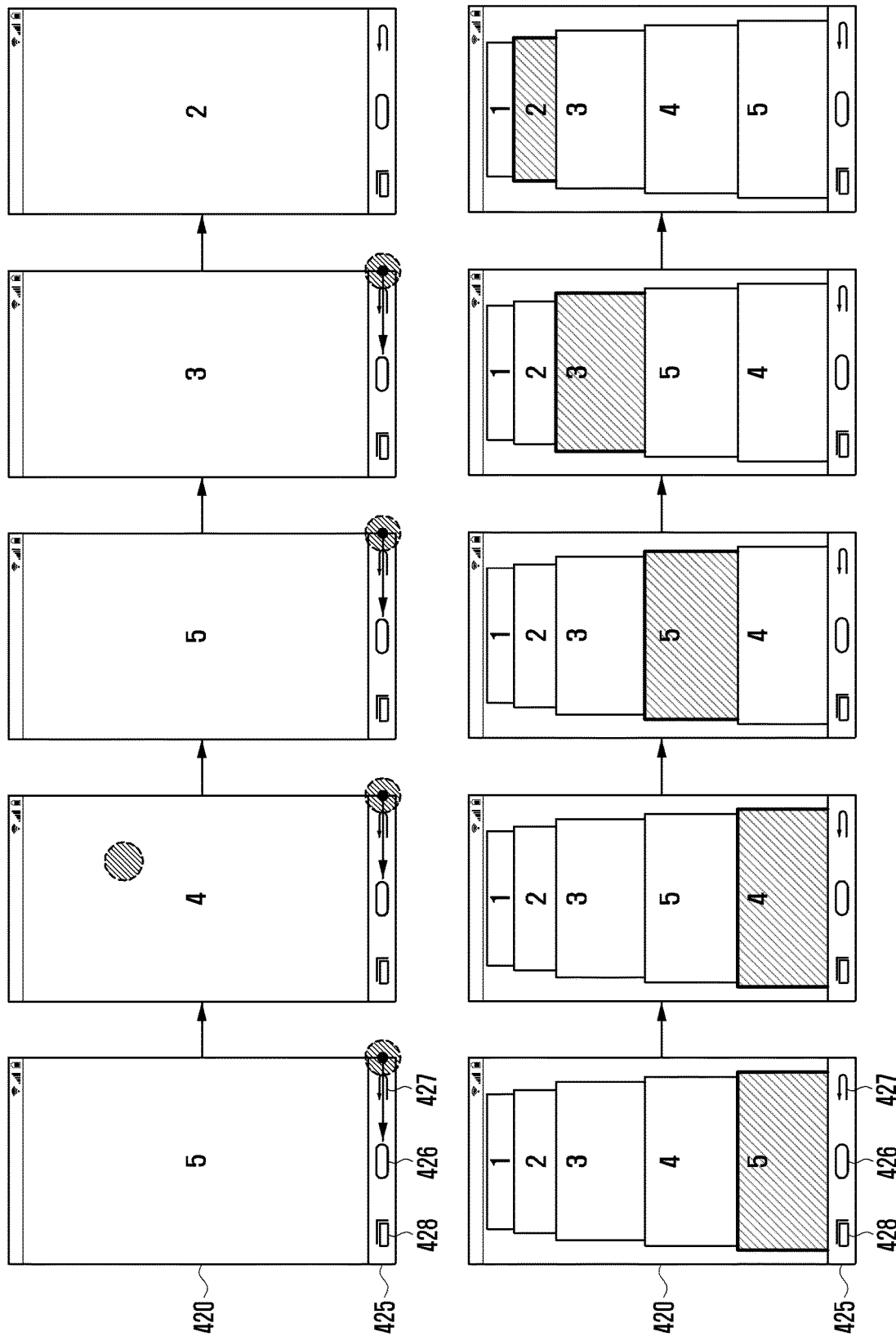
FIG. 9 is a diagram explaining an example of operation 750 in a method for switching applications according to various embodiments of the present disclosure.

FIG. 9 is a diagram explaining an example of operation 750 in a method for switching applications according to various embodiments of the present disclosure. Referring to FIG. 9, an example of the operation 750 will be described in detail.

As illustrated in FIG. 9, for example, 5 applications executed by a user may be displayed on a touch screen 420 in a stack structure. For example, the first to fifth applications 1 to 5 may be formed in the stack structure in accordance with the user's execution order. In a global navigation area 425 formed on a lower portion of the touch screen 420, if a user touches and swipes a cancel key 427 in the direction of a home key 426 (first direction), and then touches the fourth application 4 to cause a touch event to occur, the fourth application 4 may move to the head, and the fifth application 5 may be deployed in the rear of the fourth application 4. Further, if the user touches the cancel key 427 once more and swipes the cancel key 427 in the direction of the home key 426 (first direction), the processor 440 may clearly display and expose only the fifth application 5 deployed in the rear of the fourth application 4, but may dimly display the fourth to first applications that are the remaining applications. Further, if the user touches the cancel key 427 once more and swipes the cancel key 427 in the direction of the home key 426 (first direction), the processor 440 may clearly display and expose only the third application 3 deployed in the rear of the fifth application 5, but may dimly display the fourth, fifth, fourth, second, and first applications that are the remaining applications. That is, among the plurality of applications deployed in the stack structure, if the user touches and swipes the cancel key 427 or the menu key 428 in the direction of the home key 426 (first direction or second direction), the processor 440 may expose the corresponding application so that the user can identify the application. If the touch event for the corresponding application has occurred by the user, for example, the application in which the touch event has occurred may be executed in foreground and may also be moved to the head of the stack structure.

According to an embodiment, at operation 760, the processor 440 may count and store in the memory 430 execution information of the application executed through the occurrence of the touch event at operation 750.

Figure 10:
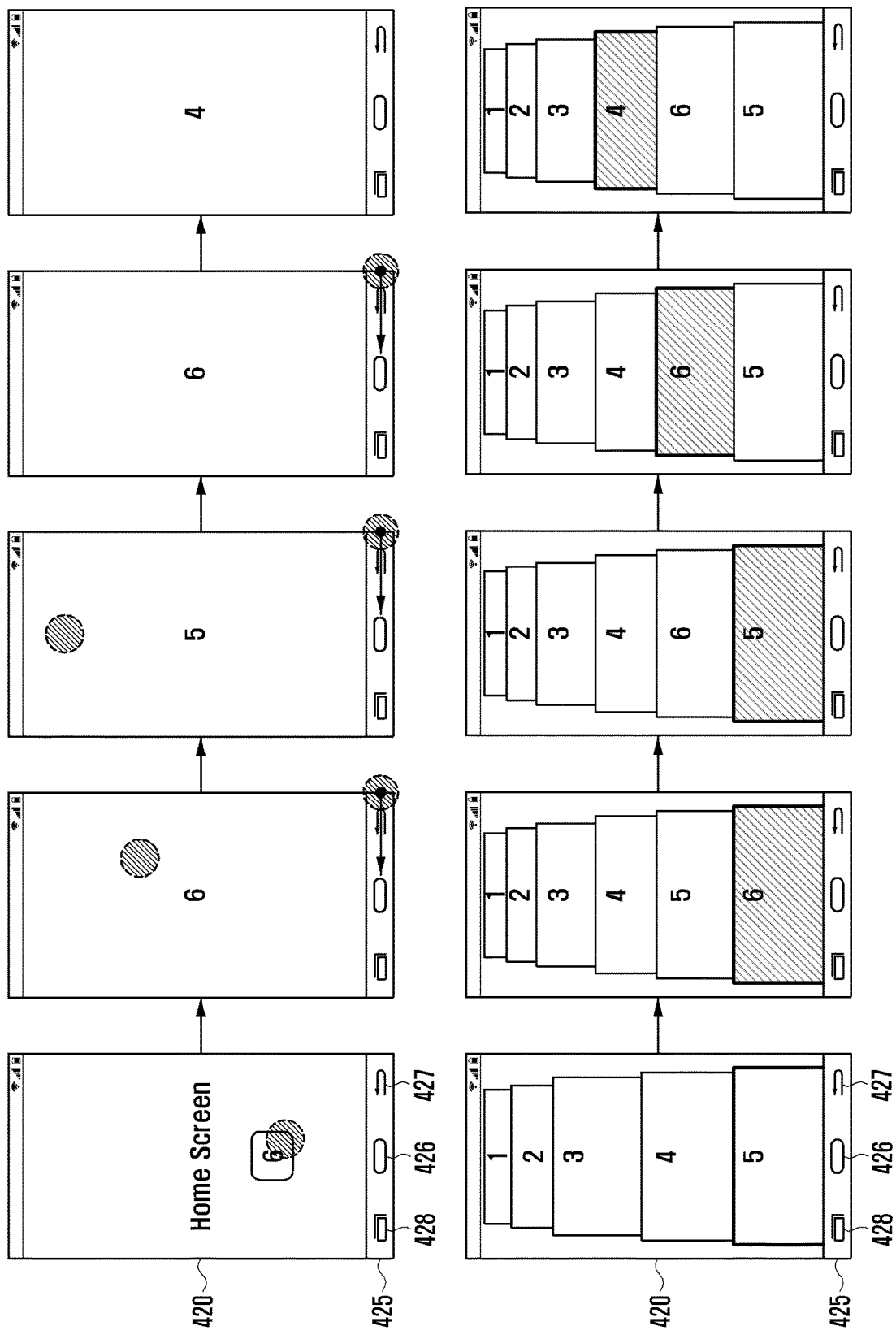
FIG. 10 is a diagram explaining an example of operation 760 in a method for switching applications according to various embodiments of the present disclosure.

FIG. 10 is a diagram explaining an example of operation 760 in a method for switching applications according to various embodiments of the present disclosure. In detail, FIG. 10 illustrates an example in which a touch event has occurred with respect to a new application that is not in the memory 430. Referring to FIG. 10, an example of the operation 760 will be described in detail.

As illustrated in FIG. 10, for example, a user may execute the sixth application 6 that was not previously executed on a home screen that is displayed in an initial state of the touch screen 420. The first to fifth applications 1 to 5 may be displayed in the order of the applications previously executed by a user. If the new sixth application is executed, the sixth application 6 may be deployed in front of the fifth application 5. The processor 440 may count and store in the memory 430 execution information of the sixth application 6 newly executed. In a global navigation area 425 formed on a lower portion of the touch screen 420, if a user touches and swipes a cancel key 427 in the direction of a home key 426 (first direction), and then touches the fifth application 5 to cause a touch event to occur, the fifth application 5 may move to the head, and the sixth application 6 previously executed may be deployed in the rear of the fifth application 5. In this case, even the execution information of the fifth application 5 executed through the occurrence of the touch event may be counted by the processor 440 and may be stored in the memory. If the user touches the cancel key 427 once more and swipes the cancel key 427 in the direction of the home key 426 (first direction), the processor 440 may clearly display and expose only the sixth application 6 deployed in the rear of the fifth application 5, but may dimly display the fifth, and fourth to first applications that are the remaining applications. Further, if the user touches the cancel key 427 once more and swipes the cancel key 427 in the direction of the home key 426 (first direction), the processor 440 may clearly display and expose only the fourth application 4 deployed in the rear of the sixth application 6, but may dimly display the fifth, sixth, and third to first applications that are the remaining applications.

Figure 11:
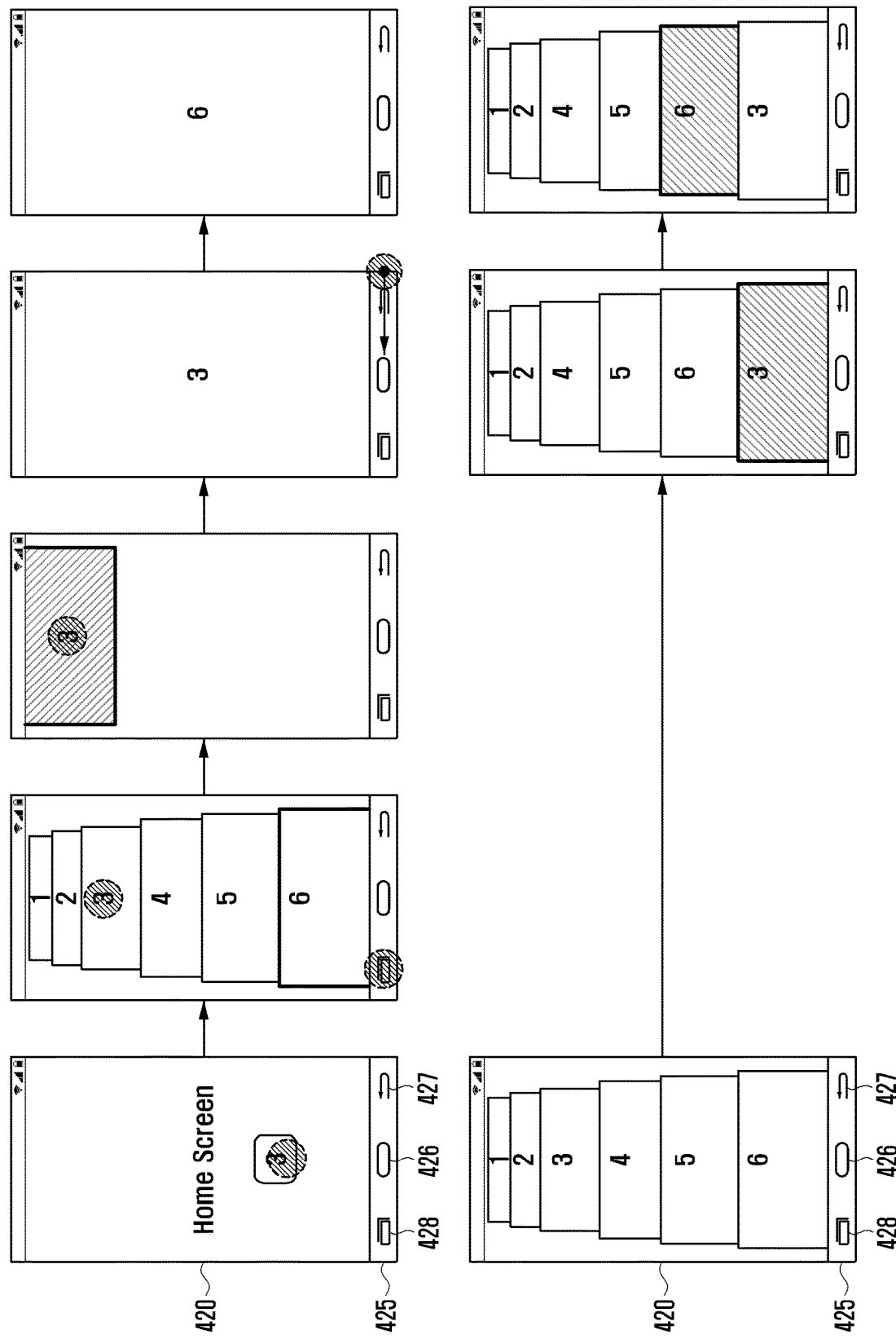
FIG. 11 is a diagram explaining another example of operation 760 in a method for switching applications according to various embodiments of the present disclosure.

FIG. 11 is a diagram explaining another example of operation 760 in a method for switching applications according to various embodiments of the present disclosure. In detail, FIG. 11 illustrates an example in which a touch event has occurred with respect to an application that is stored in the memory 430. Referring to FIG. 11, another example of the operation 760 will be described in detail.

As illustrated in FIG. 11, for example, a user may enter into a task manager mode for displaying an application list previously executed by the user through touch of a menu key 428 on a lower portion of a touch screen 420. The first to sixth applications 1 to 6 previously executed by the user may be formed in a stack structure in the order of their recent execution. If the user touches the third application 3 among the first to sixth applications 1 to 6, the third application may be deployed at the head, that is, in front of the sixth application 3. The processor 440 may count and store in the memory 430 execution information of the third application 3 in which the touch event has occurred. In a global navigation area 425 formed on a lower portion of the touch screen 420, if the user touches and swipes a cancel key 427 in the direction of a home key 426 (first direction), the processor 440 may clearly display and expose only the sixth application 6 deployed in the rear of the third application 3, but may dimly display the third, fifth, fourth, second, and first applications that are the remaining applications.

Figure 12:
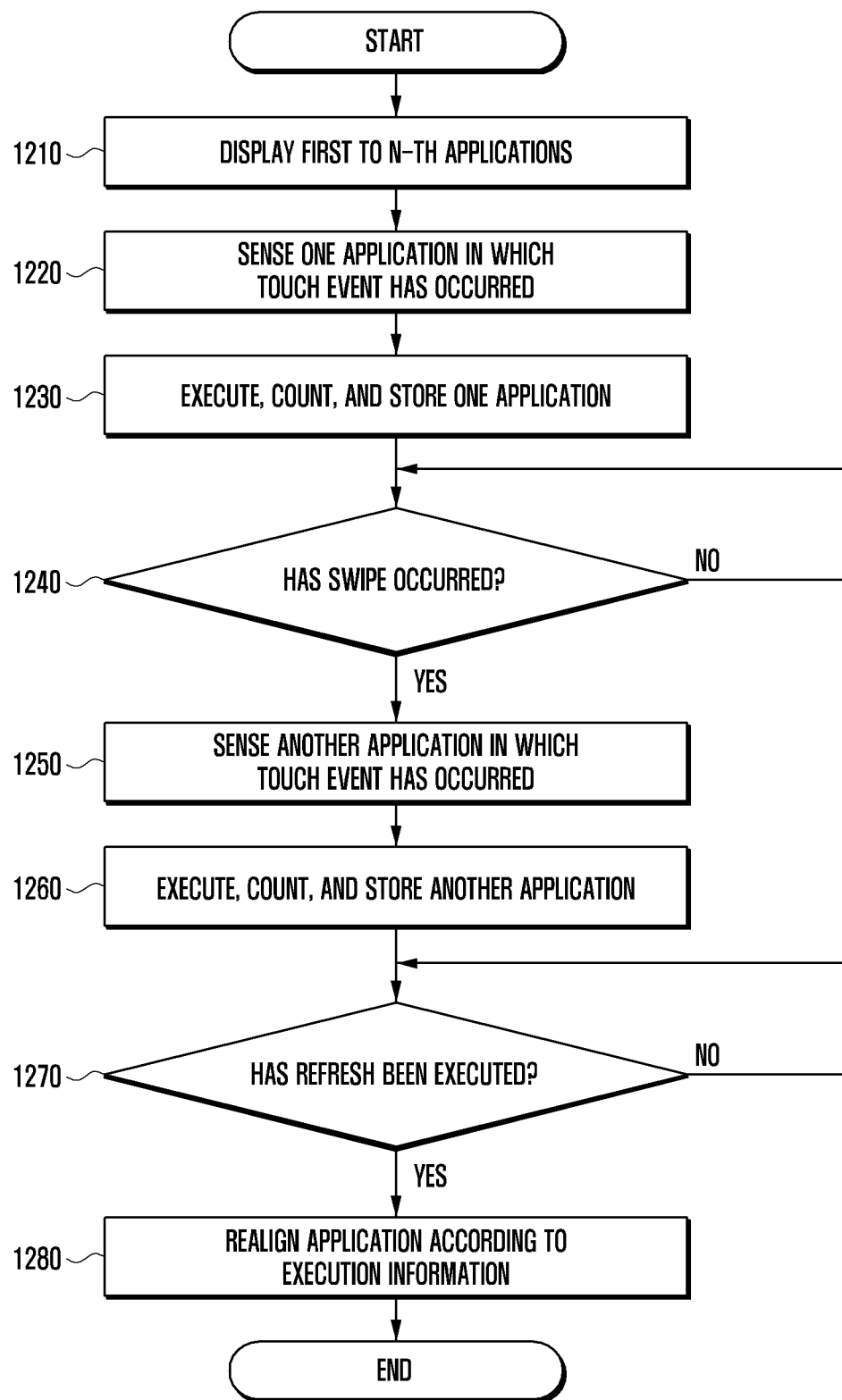
FIG. 12 is a flowchart illustrating a method for aligning applications used in an electronic device according to various embodiments of the present disclosure.

FIG. 12 is a flowchart illustrating a method for aligning applications used in an electronic device according to various embodiments of the present disclosure.

According to an embodiment, if a user touches a menu key 428 of a touch screen 420, a processor 440, at operation 1210, may display applications 1 to n in a stack structure previously executed by the user through the display unit 422 as illustrated in FIG. 6.

According to an embodiment, at operation 1220, the processor 440 may sense whether a touch event has occurred with respect to any one of the plurality of applications 1 to n displayed in the stack structure.

According to an embodiment, at operation 1230, the processor 440 may execute one application in which the touch event has occurred, and may count and store in a memory 430 execution information of the executed one application.

According to an embodiment, at operation 1240, the processor 440 may determine whether a swipe has occurred by the user through a cancel key 427 and a menu key 428 of a global navigation area 425. The swipe operation may include the touch and swipe of the cancel key 427 leftward (first direction) or the touch and swipe of the menu key 42 rightward (second direction) around a home key 426 formed in the global navigation area 425.

According to an embodiment, if the swipe has occurred through operation 1240, the processor, at operation 1250, may sense whether the touch event has occurred in the other application among the plurality of applications 1 to n.

According to an embodiment, at operation 1260, the processor may execute the other application in which the touch event has occurred, and may count and store in the memory 430 execution information of the other executed application.

According to various embodiments of the present disclosure, with respect to the first to n-th applications 1 to n displayed in the stack structure, the above described operations 1210 to 1260 are repeated to count and store in the memory 430 execution information of the application executed in accordance with the occurrence of the touch event.

Figure 13:
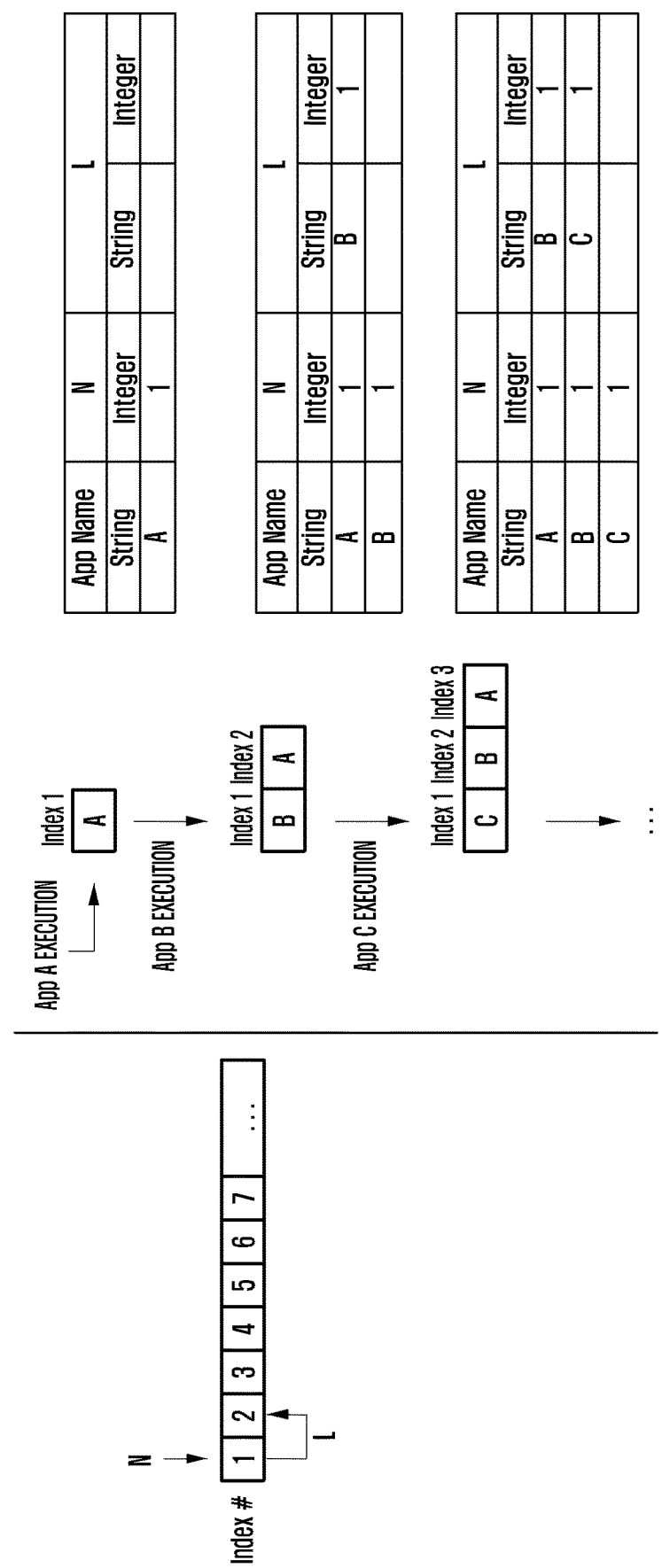
FIG. 13 is a diagram explaining an example of operations 1230 and 1260 in a method for aligning applications according to various embodiments of the present disclosure.

FIG. 13 is a diagram explaining an example of operations 1230 and 1260 in a method for aligning applications according to various embodiments of the present disclosure. Referring to FIG. 13, an example in which execution information of applications of operations 1230 and 1260 is counted and stored in a data field of the memory 430 will be described in detail.

As illustrated in FIG. 13, a user can touch and execute applications displayed on a touch screen 420. For example, if application "A" is executed by a user's touch, application "A" may be displayed on index 1 of the data field, application "A" may be stored in a string of an application name (App name), and the number of times of execution 1 of application "A" may be stored in an integer of the individual use frequency N of the application. If application "B" is executed by the user's touch, application "B" may be displayed on index 1 of the data field, and application "A" may be moved to index 2. In this case, application "B" may be stored in the string of the application name (App name), and the number of times of execution 1 of application "B" may be stored in the integer of the individual use frequency N of the application. Further, application "B" may be stored in the string of the application group use frequency L, and the number of times of execution 1 of application "B" may be stored in the integer. The group use frequency L is a field indicating correlations between the applications, and may be an execution frequency of the applications executed after the corresponding application. That is, the group use frequency L may be an application group frequently used together with the corresponding application. If application "C" is executed by the user's touch, "C" may be displayed on index 1 of the data field, application "A" may be moved to index 3, and application "B" may be moved to index 2. In this case, application "C" may be stored in the string of the application name (App name), and the number of times of execution 1 of application "C" may be stored in the integer of the individual use frequency N of the application. Further, application "C" may be stored in the string of the group use frequency L of application "B", and the number of times of execution 1 of application "C" may be stored in the integer. Accordingly, if the user touches the menu key 428, applications A to C executed by the user may be displayed in the stack structure. When the user touches the menu key 428, the most lately executed application C may be displayed at the head of the stack structure.

According to an embodiment, at operation 1270, the processor 440 may determine whether a refresh function can be executed through user's touch of a refresh key 429.

According to an embodiment, if the user touches the refresh key 429 through operation 1270, the processor 440, at operation 1280, may realign the first to n-th applications 1 to n in accordance with a count value of the execution information with respect to the individual use frequency N of the application frequently used by the user and the group use frequency L of the application.

Figure 14:
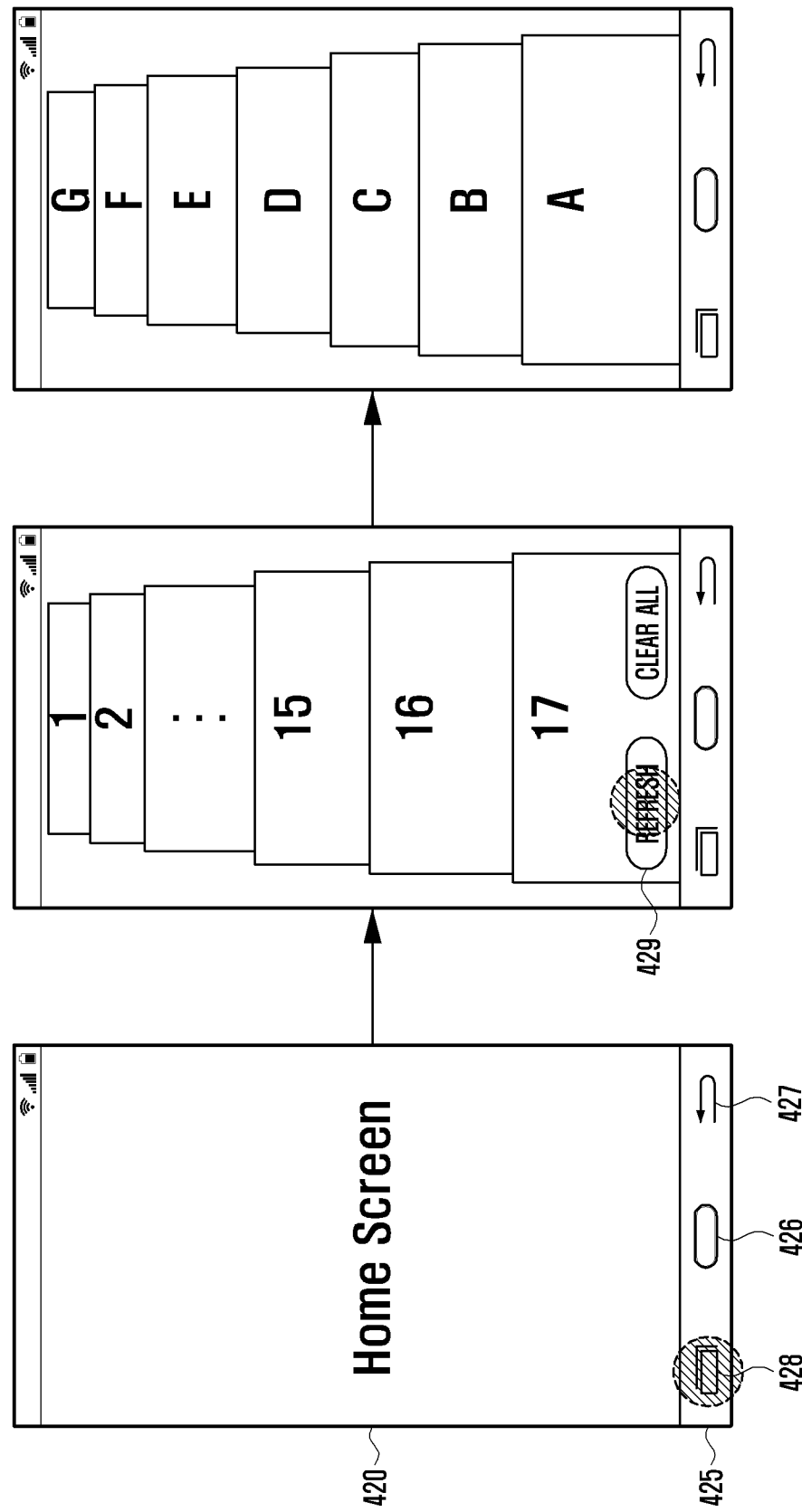
FIG. 14 is a diagram explaining an example of operation 1280 in a method for aligning applications according to various embodiments of the present disclosure.

FIG. 14 is a diagram explaining an example of operation 1280 in a method for aligning applications according to various embodiments of the present disclosure. In detail, FIG. 14 illustrates an example in which a specific application is selected and the order of arrangement is realigned. Referring to FIG. 14, an example of operation 1280 will be described in detail.

As illustrated in FIG. 14, if a user touches a menu key 428 of a global navigation area 425, specific applications executed by a user may be displayed in a stack structure in the order of their execution. For example, if 17 applications have been executed by the user, the 17$^{th}$ application most lately executed may be deployed at the head, and the first application 1 firstly executed may be deployed at the tail. In this state, if the user touches a refresh key 429, the processor 440 may store only 7 applications (A to G) frequently used together by the user, but may delete the remaining 10 applications from the memory 430. For example, referring to FIG. 14, it can be identified that only applications A to B frequently used together by the user after the touch of the refresh key 429 among the 17 applications executed by the user are displayed on the touch screen 420. The applications frequently used together by the user may be an application group subsequently executed after the execution of the corresponding application. In the above-described example, if the user touches the refresh key 429, it is described that 7 applications (applications A to G) are displayed on the touch screen 420. However, if the number of applications executed by the user is smaller than 7, that is, if the number of applications is equal to or smaller than 6, the order of only 6 applications may be realigned in accordance with the use frequency (the number of times of execution).

Figure 15B:
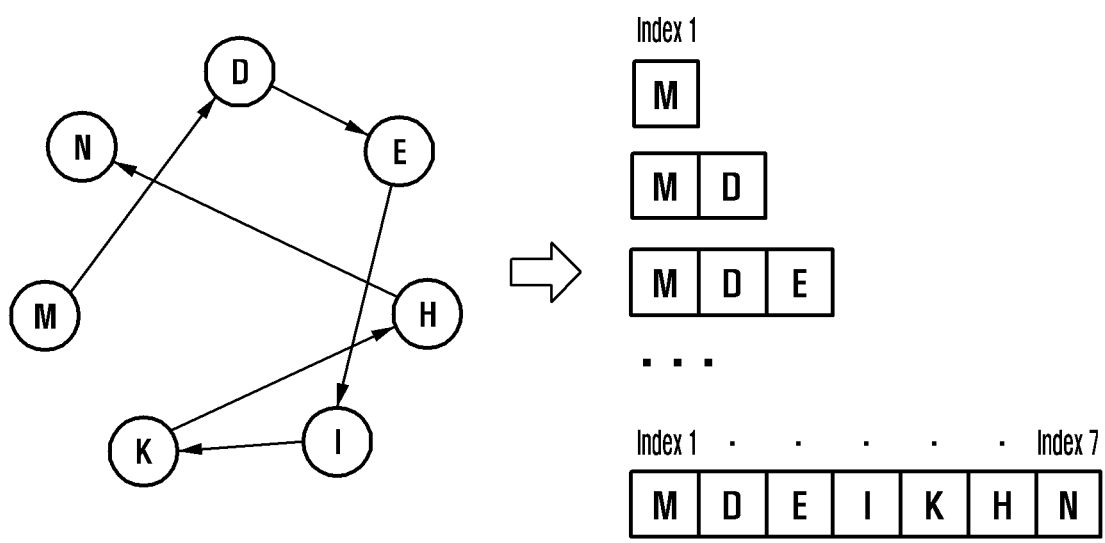

FIGS. 15A and 15B are diagrams explaining another example of operation 1280 in a method for aligning applications according to various embodiments of the present disclosure. In detail, FIGS. 15A and 15B illustrate an example in which a count according to execution information of applications executed by a user is extracted and the deployment order of the applications are realigned. Referring to FIGS. 15A and 15B, another example of the operation 1280 will be described in detail.

As illustrated in FIGS. 15A and 15B, the processor 440 may store application names (A to Z) in a string of the individual use frequency N of the applications A to Z executed by a user's touch, and may count and store the number of times of execution of the corresponding applications (A to Z) in an integer of the individual use frequency N of the application. In this case, the processor 440 may store the application names (A to Z) and the number of times of execution of the applications (A to Z) in a memory 430.

Referring to FIG. 15A, if the user touches a refresh key 429, the processor 440 may select 7 upper applications D, E, H, I, K, M, and N having high individual use frequency N of the applications. Among the 7 applications D, E, H, I, K, M, and N, application M having the highest individual use frequency N (33 times execution) may be deployed in index 1 as illustrated in FIG. 15B. Further, application D having the highest group use frequency L of application M having the highest individual use frequency N (17 times execution) may be deployed in index 2. Application D may be an application immediately executed after application M. Further, application E having the highest group use frequency L of application D stored in index 2 (9 times execution) may be deployed in index 3. By performing the above-described method up to index 7, the processor 440 may realign the applications in the order of M, D, E, I, K, H, and N as illustrated in FIG. 15B.

According to various embodiments of the present disclosure, the individual use frequency N of the applications may have the same count value. If the individual use frequency N of the applications, that is, the number of times of execution of the corresponding applications is the same, it becomes possible to deploy the application first executed by the user in front of the stack structure.

Accordingly, according to various embodiments disclosed in the description, by touching the menu key 428 of the electronic device 400, switching of the plurality of applications displayed in the stack structure can be conveniently performed, and by performing a refresh function with respect to the plurality of applications, the applications frequently used by the user can be realigned in accordance with the use pattern.

Various embodiments of the present disclosure disclosed in this specification and drawings and specific terms used therein are illustrated to help understanding of the present disclosure, but are not intended to limit the scope of the present disclosure.

Accordingly, it is to be analyzed that all changes or modifications derived based on the technical idea according to various embodiments of the present disclosure are included in the scope of various embodiments of the present disclosure in addition to the described embodiments.

The invention claimed is:

1. An electronic device comprising:
a wireless communication circuitry;
a touch screen;
a processor coupled to the wireless communication circuitry and the touch screen; and
a memory coupled to the processor,
wherein the memory, when executed, stores instructions to cause the processor to control to:
display, on the touch screen, an execution screen of a first application as a foreground application among a plurality of applications including the first application, a second application and a third application, the plurality of applications having a stack in order of the third application, the first application and the second application, respectively,
display, on the touch screen, an execution screen of the second application as the foreground application, instead of the execution screen of the first application, in response to a first swipe gesture input from a first position of the touch screen, the first swipe gesture input being received while the execution screen of the first application is displayed as the foreground application while the stack is in order of the third application, the first application and the second application,
display, on the touch screen, an execution screen of the third application as the foreground application, instead of the execution screen of the first application, in response to a second swipe gesture input from a second position of the touch screen, the second swipe gesture input being received while the execution screen of the first application is displayed as the foreground application while the stack is in order of the third application, the first application and the second application, and the second swipe gesture input having a direction different from a direction of the first swipe gesture input,
receive a user input on the execution screen of the first application displayed as the foreground application while the stack is in order of the third application, the first application and the second application, and
based on receiving the user input on the execution screen of the first application displayed as the foreground application, change order of the stack to be in order of the first application, the third application and the second application, respectively.

2. The electronic device of claim 1, wherein the execution screens of the first to third applications are displayed on the entire touch screen.

3. The electronic device of claim 1,
wherein the first swipe gesture input is a gesture moving from a neighborhood of a left-side lower-end corner of the execution screen of the first application to a right-side direction, and
wherein the second swipe gesture input is a gesture moving from a neighborhood of a right-side lower-end corner of the execution screen of the second application to a left-side direction.

4. The electronic device of claim 3,
wherein the third application among the plurality of applications is an application executed earlier than the first application, and
wherein the second application is an application executed later than the first application.

5. The electronic device of claim 1, wherein the memory, when executed, includes instructions to cause the processor to display at least a part of the plurality of applications being executed on one screen of the touch screen as a stack if a specific gesture is input to the touch screen.

6. A method for displaying applications, the method comprising:
displaying, by a processor, on a touch screen, an execution screen of a first application as a foreground application among a plurality of applications including the first application, a second application and a third application, the plurality of applications having a stack in order of the third application, the first application and the second application, respectively;
displaying, by the processor, on the touch screen, an execution screen of the second application as the foreground application, instead of the execution screen of the first application, in response to a first swipe gesture input from a first position of the touch screen, the first swipe gesture input being received while the execution screen of the first application is displayed as the foreground application while the stack is in order of the third application, the first application and the second application;
displaying, by the processor, on the touch screen, an execution screen of the third application as the foreground application, instead of the execution screen of the first application, in response to a second swipe gesture input from a second position of the touch screen, the second swipe gesture input being received while the execution screen of the first application is displayed as the foreground application while the stack is in order of the third application, the first application and the second application, and the second swipe gesture input having a direction different from a direction of the first swipe gesture input;
receiving a user input on the execution screen of the first application displayed as the foreground application while the stack is in order of the third application, the first application and the second application; and
based on receiving a user input on the execution screen of the first application displayed as the foreground application, changing, by the processor, order of the stack to order of the first application, the third application and the second application, respectively.

7. The method of claim 6, wherein the execution screens of the first to third applications are displayed on the entire touch screen.

8. The method of claim 6,
wherein the first swipe gesture input is a gesture moving from a neighborhood of a left-side lower-end corner of the execution screen of the first application to a right-side direction, and
wherein the second swipe gesture input is a gesture moving from a neighborhood of a right-side lower-end corner of the execution screen of the second application to a left-side direction.

9. The method of claim 8,
wherein the third application among the plurality of applications is an application executed earlier than the first application, and
wherein the second application is an application executed later than the first application.

10. The method of claim 6, further comprising displaying at least a part of the plurality of applications being executed on one screen of the touch screen as a stack if a specific gesture is input to the touch screen.

11. An electronic device comprising:
a wireless communication circuitry;
a touch screen;
a processor coupled to the wireless communication circuitry and the touch screen; and
a memory coupled to the processor,
wherein the memory, when executed, stores instructions to cause the processor to control to:
  display, on an entire touch screen, an execution screen of a first application as a foreground application among a plurality of applications including the first application, a second application, and a third application, the plurality of applications having a stack in arrangement of the third application, the first application, and the second application, respectively,
  display, on the entire touch screen, an execution screen of the second application as the foreground application, instead of the execution screen of the first application, in response to a swipe gesture input from a specific position of the execution screen of the first application,
  receive a touch gesture input on the execution screen of the first application displayed as the foreground application while the stack is in order of the third application, the first application, the second application, and
  based on receiving the touch gesture input on the execution screen of the first application displayed as the foreground application, change arrangement of the stack to arrangement of the first application, the third application, and the second application, respectively.

12. The electronic device of claim 11, wherein the arrangement of the stack is changed from a first arrangement in which at least a part of the execution screen of the first application is deployed to overlap at least a part of the execution screen of the second application to a second arrangement in which at least a part of the execution screen of the second application is deployed to overlap at least a part of the execution screen of the first application.

13. The electronic device of claim 12, wherein in the arrangement of the stack of the plurality of applications, the first application is an application executed earlier than the second application.

14. The electronic device of claim 11, wherein the processor recognizes the touch gesture as a selection gesture of the second application.

15. The electronic device of claim 11, wherein the swipe gesture is one of a gesture moving from a neighborhood of a left-side lower-end corner of the execution screen of the first application to a right-side direction, or a gesture moving from a neighborhood of a left-side lower-end corner of the execution screen of the second application to a right-side direction.

16. A method for displaying applications, the method comprising:
displaying, by a processor, on an entire touch screen, an execution screen of a first application as a foreground application among a plurality of applications including the first application, a second application, and a third application, the plurality of applications having a stack in arrangement of the third application, the first application, and the second application, respectively;
displaying, by the processor, on the entire touch screen, an execution screen of the second application as the foreground application, instead of the execution screen of the first application, in response to a swipe gesture input from a specific position of the execution screen of the first application;
receiving a touch gesture input on the execution screen of the first application displayed as the foreground application while the stack is in order of the third application, the first application, and the second application; and
based on receiving the touch gesture input on the execution screen of the first application displayed as the foreground application, changing arrangement of the stack to arrangement of the first application, the third application, and the second application, respectively.

17. The method of claim 16, wherein the arrangement of the stack is changed from a first arrangement in which at least a part of the execution screen of the first application is deployed to overlap at least a part of the execution screen of the second application to a second arrangement in which at least a part of the execution screen of the second application is deployed to overlap at least a part of the execution screen of the first application.

18. The method of claim 17, wherein in the arrangement of the stack of the plurality of applications, the first application is an application executed earlier than the second application.

19. The method of claim 16, wherein the touch gesture is recognized as a selection gesture of the second application.

20. The method of claim 16, wherein the swipe gesture is one of a gesture moving from a neighborhood of a left-side lower-end cornerof the execution screen of the first application to a right-side direction, or a gesture moving from a neighborhood of a left-side lower-end corner of the execution screen of the second application to a right-side direction.

21. A non-transitory computer readable recording medium recorded with a program for performing an application display method in an electronic device, the program performing a method comprising:
displaying, on a touch screen, an execution screen of a first application as a foreground application among a plurality of applications including the first application, a second application and a third application, the plurality of applications having a stack in order of the third application, the first application and the second application, respectively;
displaying, on the touch screen, an execution screen of the second application as the foreground application, instead of the execution screen of the first application, corresponding to a first swipe gesture input from a first position of the touch screen, the first swipe gesture input being received while the execution screen of the first application is displayed as the foreground application while the stack is in order of the third application, the first application and the second application;

displaying, on the touch screen, an execution screen of the third application as the foreground application, instead of the execution screen of the first application, corresponding to a second swipe gesture input from a second position of the touch screen, the second swipe gesture input being received while the execution screen of the first application is displayed as the foreground application while the stack is in order of the third application, the first application and the second application, and the second swipe gesture input having a direction different from a direction of the first swipe gesture input;

receiving a user input on the execution screen of the first application displayed as the foreground application while the stack is in order of the third application, the first application and the second application; and based on receiving the user input on the execution screen of the first application displayed as the foreground application, changing order of the stack to order of the first application, the third application and the second application, respectively.

22. An electronic device comprising:

a wireless communication circuitry;

a touch screen;

a processor coupled to the wireless communication circuitry and the touch screen; and a memory coupled to the processor, wherein the memory, when executed, stores instructions to cause the processor to control to:

display, on the touch screen, an execution screen of a first application as a foreground application among a plurality of applications including the first application, a second application and a third application, wherein the plurality of applications are arranged in order of the third application, the first application and the second application, respectively, display, on the touch screen, an execution screen of the second application as the foreground application, instead of the execution screen of the first application, in response to a first swipe gesture input from a first position of the touch screen, the first swipe gesture input being received while the execution screen of the first application is displayed as the foreground application while the plurality of applications are arranged in order of the third application, the first application and the second application, display, on the touch screen, an execution screen of the third application as the foreground application, instead of the execution screen of the first application, in response to a second swipe gesture input from a second position of the touch screen, the second swipe gesture input being received while the execution screen of the first application is displayed as the foreground application while a stack is in order of the third application, the first application and the second application, and the second swipe gesture input having a direction different from a direction of the first swipe gesture input, receive a user input on the execution screen of the first application displayed as the foreground application while the plurality of applications are arranged in order of the third application, the first application and the second application, and based on receiving the user input on the execution screen of the first application displayed as the foreground application, change order of the plurality of applications to order of the first application, the third application and the second application, respectively.

* * * * *